United States Patent [19]

Binder et al.

[11] Patent Number: 5,381,209
[45] Date of Patent: Jan. 10, 1995

[54] PROCESS AND APPARATUS FOR PROCESSING STRIPS OF PHOTOGRAPHIC TAPE MATERIAL

[75] Inventors: Erich Binder, Buchs; Jürg Kunz, Bülach, both of Switzerland

[73] Assignee: Gretag Imaging AG, Regensdorf, Switzerland

[21] Appl. No.: 81,164

[22] Filed: Jun. 25, 1993

[30] Foreign Application Priority Data

Jun. 29, 1992 [EP] European Pat. Off. ............ 92810497

[51] Int. Cl.⁶ ........................ G03B 27/32; G03B 27/52
[52] U.S. Cl. ........................ 355/27; 355/32; 355/318
[58] Field of Search ................. 355/27, 26, 23, 24, 355/32, 318

[56] References Cited

U.S. PATENT DOCUMENTS

| | | | |
|---|---|---|---|
| 4,319,833 | 3/1982 | Hidding | 355/23 |
| 4,419,007 | 12/1983 | Kingsley | 355/23 |
| 4,456,236 | 6/1984 | Buddendeck | 355/24 |
| 4,645,351 | 2/1987 | Seto | 356/443 |
| 4,659,213 | 4/1987 | Matsumoto | 355/38 |

FOREIGN PATENT DOCUMENTS

| | | |
|---|---|---|
| 0159419 | 10/1985 | European Pat. Off. . |
| 3420311 | 12/1984 | Germany . |
| 3426503 | 1/1985 | Germany . |
| 4114343 | 11/1992 | Germany . |

Primary Examiner—Monroe H. Hayes
Attorney, Agent, or Firm—Burns, Doane, Swecker and Mathis

[57] ABSTRACT

A process and apparatus for processing strips of a photographic tape material whose surface is at least partially coated with, for example, an emulsion. In an exemplary embodiment, the apparatus includes means for determining the position of the side of the strip with the coated surface. In a first case, in which the side with the coated surface is in a desired position, a switch guides the unmodified strip onward for further processing. In a second case, in which the side with the coated surface is not in the desired position, the switch automatically guides the strip into a turning device before the strip is further processed.

5 Claims, 6 Drawing Sheets

PROCESS AND APPARATUS FOR PROCESSING STRIPS OF PHOTOGRAPHIC TAPE MATERIAL

BACKGROUND OF THE INVENTION

The present invention relates generally to a process and apparatus for processing strips of a photographic tape material having a surface which is at least partially coated, with, for example, an emulsion.

Processing methods for strips of photographic tape material, for example, negative film strips, and the corresponding equipment are currently employed in many variants by photographic laboratories. Depending on the type, they permit a more or less automatic processing of client orders. This is particularly the case with follow-up orders, when the copy masters are already available in the form of cut negative film strips. A high degree of automation is an advantage here, both in increasing efficiency, and thus the number of negatives to be processed per unit of time, and in assuring a high degree of reliability.

A process and corresponding device for processing such film strips is known by the prior art, e.g., U.S. Pat. No. 4,659,213. There the bar code (DX code) applied to the margin of the film strip is read. Based on the position of the DX code on the upper or lower margin of the film strip, and based on the scanned sequence, it can be determined whether the film strip is located in the desired position, for example, whether the coated side (the side to which the photosensitive emulsion is applied) is located above or below. Also determined is whether the image areas of the film strip are in the "upright" position. It may also be determined that though the film strip is positioned on the correct coated side, the image field is upside-down; or though the film strip is positioned on the wrong coated side, the image area is in an "upright" position; or both the film strip is positioned on the wrong side and the image area is upside-down.

Particularly when the coated side of the film strip is not in the desired position (for example, the coated side faces down rather than up), the automatic developing process must be interrupted, and the operating personnel must turn the film strip over before it can be fed for further processing. This considerably reduces the processing efficiency for such film strips, since stopping the apparatus, removing the given film strip, rethreading the strip, etc., and restarting the apparatus consumes a considerable period of time, during which processing of other film strips is impossible since the apparatus is out of operation. This is equivalent to the loss of efficiency.

SUMMARY OF THE INVENTION

The present invention addresses the problem of increasing the efficiency of a developing process and of a corresponding apparatus.

This problem is solved by a process whereby, in an initial case, when a side of a photographic tape material with the coated surface is in the desired position, the strip is fed on for further processing without being modified, and in a second case, in which the side with the coated surface is not in the desired position, the strip is automatically turned over before being further processed. The automatic turning of the given film strip does not interrupt the processing in the time-consuming manner described above; i.e., the film strip does not have to be removed, turned, and rethreaded. Rather, turning and rethreading of the film is performed in fully automatic fashion, consumes little time, and is highly reliable, permitting the process to achieve a considerable savings in time and thus in efficiency.

In one embodiment of a process according to the invention, the strip to be turned, according to the second case from above, is introduced one end first into a turning station. This turning station comprises a turning channel which basically runs opposite to the transport direction of the strip. The strip being turned is introduced into the turning channel. After being introduced into the turning channel, the strip is conducted out of the turning channel with its other end first and is then advanced for further processing. Thus, the film strip is turned in a simple and reliable manner, and the amount of time required to run the film is very slight.

To further enhance the efficiency of the process, in that case in which the strip requires no further treatment (for example, because the client does not wish to have prints made from the negatives of the given strip), the strips are introduced into the turning channel and are removed. By sorting out and removing these film strips, they will not further delay the processing of other film strips whose negatives will be used to make prints.

The position of the coated side of the film can be detected by, e.g., reading the bar code (DX code) provided in the margin of the strip.

The problem addressed by the invention is solved by a device having a switch provided which, in the first case—when the side with the coated surface is in the desired position—advances the unmodified strip for further processing, and in the second case—when the side with the coated surface is not in the desired position—automatically feeds the strips into a turning device before further treatment. This assures a particularly efficient processing of the film strips: film strips whose coated side is in the desired position are advanced directly for further processing. Film strips whose coated side is not in the desired position are conducted automatically by the switch to the turning device. The given film strip is turned there and can then be further processed. With the automatic turning of the given film strip, the processing does not have to be interrupted in the time-consuming fashion described above, the film strip removed, and then rethreaded. Rather, turning and rethreading of the film is performed in fully automatic fashion, consumes little time, and is highly reliable, permitting the process to achieve a considerable savings in time and thus in efficiency.

In an exemplary embodiment of a device according to the invention, the turning device comprises a turning channel which basically runs opposite to the transport direction of the strip. The switch guides the strip being turned into this turning channel one end first. It then guides the strip, with the other end first, out of the turning channel and on to further processing. The film strip is thus turned in a simple and reliable manner, and the expenditure in time for turning the film is very slight.

In one version of a device according to the invention, there are roller pairs provided for the transport of the strip; the strip is conducted between the roller pairs. Guide plates are provided to conduct the strip, and the switch comprises the guide plates, a pair of transport rollers, and a disk to which the guide plates are secured. The position of the disk is coaxial with the rotating axis of one of the transport rollers of the pair, and it rotates—along with the guide plates attached to it and the other transport roller belonging to the pair—around the disk axis between the two terminal positions. In the first of the two terminal disk positions the guide plates conduct the strip onward in unturned condition; in the second terminal position, on the other hand, the guide plates conduct the strip into the turning channel. This embodiment of the inventive device is distinguished by a high degree of reliability and by limited expense.

In an embodiment of the invention, another pair of transport rollers and another switch guide plate are positioned in succession. This further guide plate can swivel between two terminal positions in coaxial fashion with the rotating axis of one transport roller of the transport roller pair; in the first terminal position it guides the unturned strip coming from the switch and in the second terminal position it guides the strip coming from the turning channel on to further processing. This further processing is also distinguished by a high degree of reliability and by limited expense.

In an advantageous embodiment of the inventive device, reading means are furnished on either side of the transport path in the vicinity of the strip entrance to the device; when necessary, these reading means produce a turning signal based on a bar code on the margin of the strip and transmit the signal to the switch or to the drive and servomotors. Reading the bar code allows simple determination of whether or not the film must be turned before further processing, and the appropriate signal can be transmitted to the switch. This further increases the efficiency of the device.

In a further embodiment of the invention, the reading means produce an elimination signal when a strip does not need to be further processed and transmit the signal to the switch or the drive and servomotors, with the result that the strip is then conducted to the turning channel for removal. By sorting and eliminating these film strips, the latter no longer delay the processing of other strips whose negatives will be used to produce prints.

In a further embodiment of the inventive device, detection means are positioned at the immediate entrance for the strip which identify the entering strip and produce a drive signal for the drive motors of the transport rollers. This assures that the transport rollers will only be driven when strips that actually must be processed are being introduced, with the result that when there are pauses in processing, an appreciable amount of energy can be saved and wear on the individual device parts is also reduced.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein.

DETAILED DESCRIPTION OF THE PREFERRED EMBODIMENTS

Figure 1:
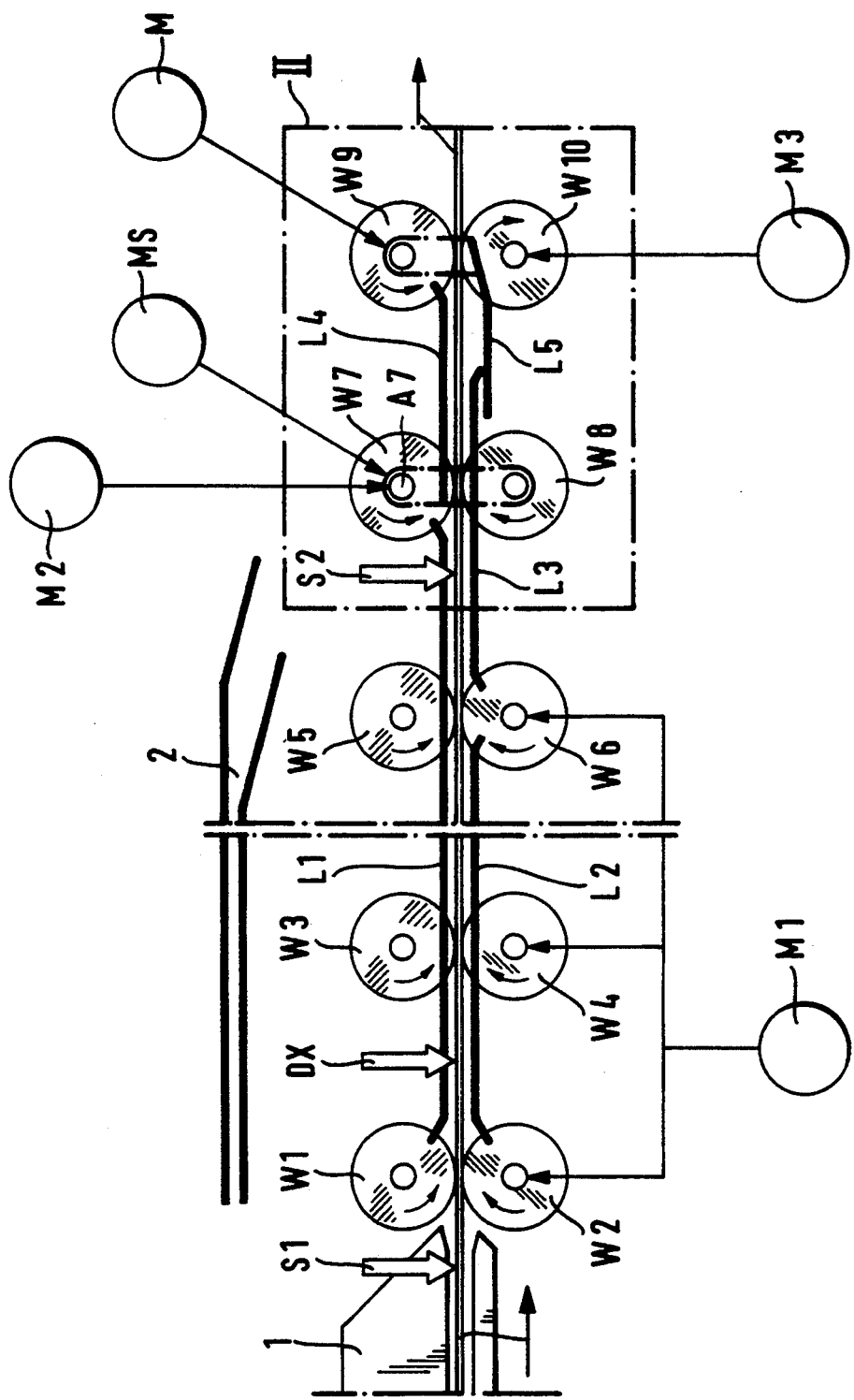
FIG. 1 shows a schematic configuration of essential parts of an exemplary embodiment of the inventive device.

A schematic configuration of the essential parts of an exemplary embodiment of the inventive device, as shown in FIG. 1, comprises an entrance 1 for a strip of the photographic tape material to be processed, e.g., a negative film strip F. Also visible are several transport roller pairs W1 and W2, W3 and W4, W5 and W6, W7 and W8, and W9 and W10, between which the film strip F is conducted and which transport the film strip F. The transport rollers are driven by motors M1, M2, and M3. Also provided is a servomotor MS. A number of guide plates L1, L2, L3, L4, and L5 are provided to guide the film strip F. A turning channel 2 is also provided, into which the film strip F to be turned can be conducted. Two sensors S1 and S2 and a DX code reader DX are each indicated by an arrow.

The principle functioning of the device will next be explained on the basis of the schematic depictions in FIGS. 1 to 5. An exemplary embodiment of the device will then be explained on the basis of the subsequent figures.

In FIG. 1 the film strip F to be processed enters through entrance 1. The sensor S1 identifies the arrival of a strip and produces a drive signal that is transmitted by electronic control element (not shown) to the drive motor M1, which in turn drives the transport rollers W1 to W6 synchronously. The strip F is then conducted through the first roller pair W1 and W2. The DX of the film strip F is then read by reading means, here in the form of a DX code reader DX. In a manner known to the prior art, it is then determined whether the position of the coated side of strip F is correct. If the position is correct, the strip F can be moved on for further processing without being turned. In an alternative case, it will be turned 180 on the transport plane, i.e., when the strip F has entered with merely a lateral inversion, but when the position of the coated side is correct. In the described embodiment, however, turning of strip F by 180 on the transport plane is not provided for.

Figure 2:
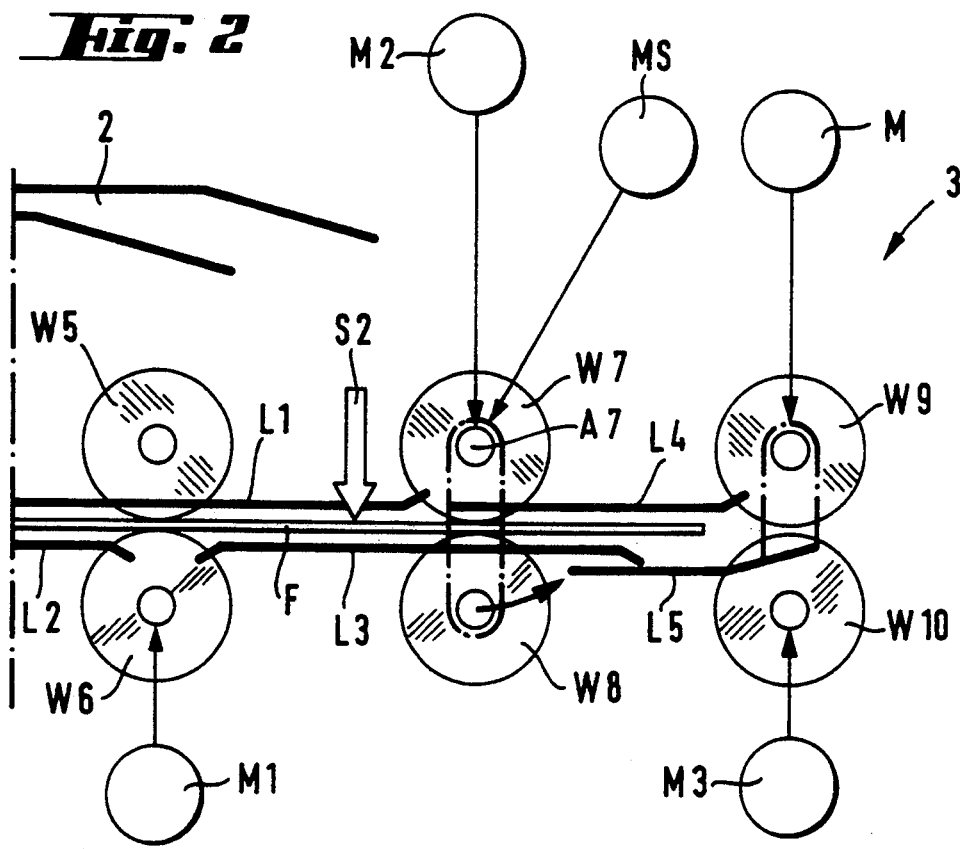
FIG. 2 shows section II of FIG. 1 in a primary position, in which the arriving strip is not diverted.

FIG. 2 shows an enlargement of section II from FIG. 1, from which it can be seen that when the guide plates L3, LA, and L5 are in this position, an arriving film strip F is not diverted into the turning channel 2, i.e., the coated side is correctly positioned. The film position shown in FIG. 2 corresponds to the initial position for turning. The sensor S2 identifies the strip F and produces a signal in the electronic control element (not shown). Since the strip F is not being turned, it is advanced unmodified for further processing by means of drive motor M2. Here motor M2 drives the roller pair W7, W8 synchronously with rollers W1 to W6.

Figure 3:
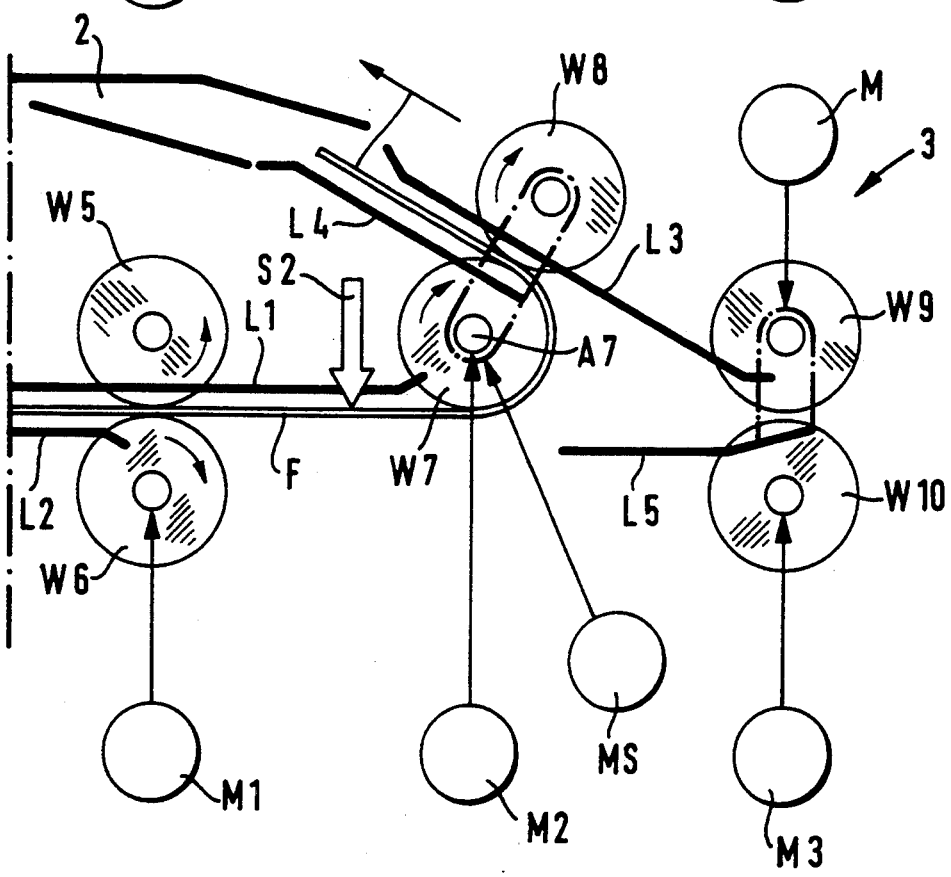
FIG. 3 shows section II of FIG. 1 in another position, in which the arriving strip is diverted into the turning channel.

In FIG. 3, on the other hand, which shows section II of FIG. 1 with guide plates L3, L4, and L5 in a different position, it will be seen that the arriving film strip F is diverted into the turning channel 2. To permit this to happen, transport roller WS, along with guide plate L3, is able to turn around axis A7 of roller W7, along with the clamped strip F, by means of the servomotor MS. The strip is then fed into the turning channel by means of motor M2.

Figure 4:
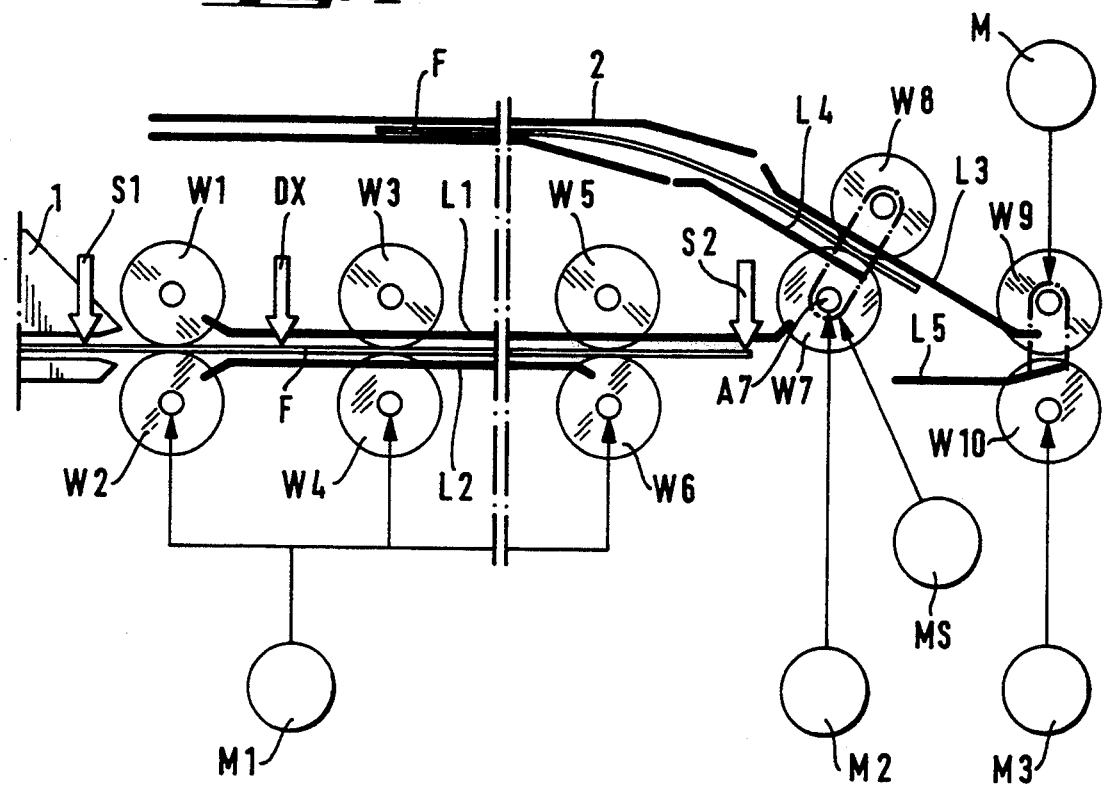
FIG. 4 shows the configuration of FIG. 1, in which the strip is introduced into the turning channel.

In FIG. 4 it will be seen that the strip F being turned has largely entered the turning channel 2. Inasmuch as the turning channel is basically positioned opposite to the direction of transport, the film strip F is caused to rest on its opposite side and thus had been turned over by its passage into the turning channel. If the film strip is to receive no further processing at all, e.g., if there are no orders for copies from the negative of the given strip, the strip F can be fed completely into the turning channel 2 and removed. This makes for a further increase in efficiency, since the strip does not have to pass through the following processing station while remaining unprocessed. A further opportunity for increasing efficiency is also evident from FIG. 4: if the strip F is in the turning channel 2 and must either pass out of the turning channel 2 for further processing or be removed, the next strip can be transported in the interim to just in front of roller W7 to occupy a kind of waiting position. This is possible because the drive motors M1 and M2 basically operate independent of each other.

Figure 5:
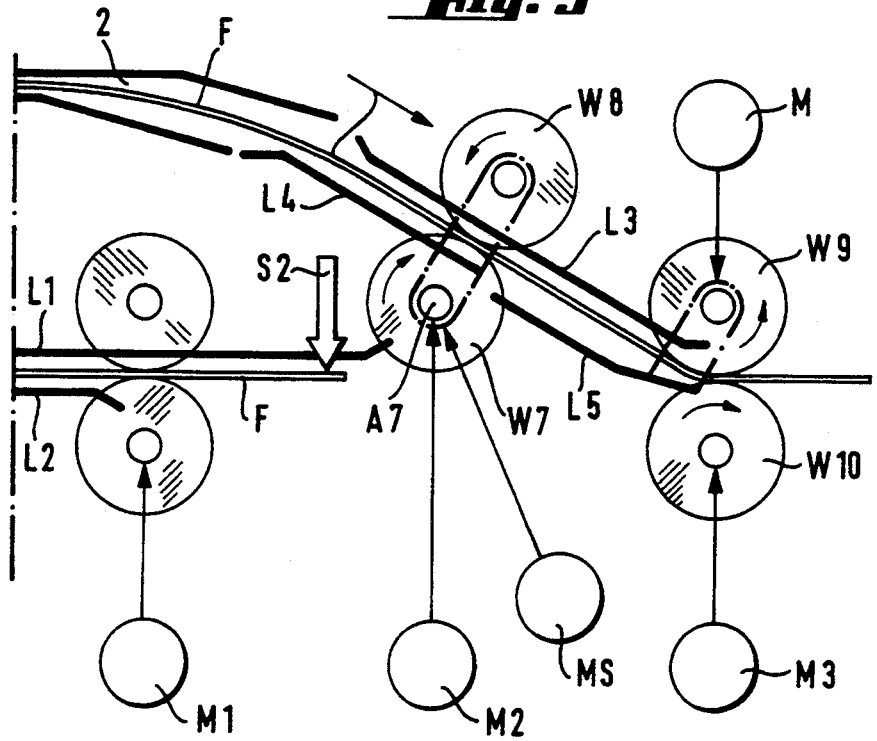
FIG. 5 shows section II of FIG. 1 in another position, in which the strip fed into the turning channel is conducted out of the turning channel.

FIG. 5, finally, shows how strip F, most of which has entered the turning channel and has been turned, is then removed from the turning channel and fed to the following processing stations. To permit this, the guide plate L5 is also swiveling out of its resting position. This rotation of the guide plate L5 may be performed by an electromagnet M, which attracts the guide plate or the flange attached to it and thus causes it to swivel. This is indicated schematically in FIG. 5. The strip F can only be advanced out of the turning channel for further processing by means of a drive signal from the electronic control element to the motor M3, which then drives the roller pair N9, W10 synchronously with motor M2.

As explained above, to increase efficiency it is possible to determine whether a strip F entering the apparatus includes a negative from which a print is to be made. If it does not, the strip can be removed and does not have to be advanced for further processing. This determination is made by reading the DX code using the DX code reader DX or by making a negative count with sensor S1. This may occur as follows.

When the DX code is a so-called extended DX code and contains information of the number of the negatives, the DX code reader DX reads this extended DX code and compares the numbers of the film strip negatives with the input from the operating personnel on which negatives are to be used to produce prints. If the film strip does not contain a negative from which a print is to be made, this strip can be fed into the turning channel as explained above and removed.

When the DX code is not an extended DX code, but the apparatus has already been informed by the operating personnel of which negative with which number is at the beginning of the film strip and whether the following negative numbers are increasing or decreasing and, furthermore, when the apparatus has been informed by the operating personnel of which negatives are to be used to produce prints, the negatives can be counted with the aid of sensor S1 and the electronic control element, with the result that one or more prints are produced from the given negative. If the film strip F does not contain a negative from which a print is to be made, this strip can be fed into the turning channel as explained above and removed.

In order to make this possible for 135 films, the described exemplary embodiment of the inventive device includes four other roller pairs between roller pairs W3, W4 and WS, W6, which, however, are not shown for reasons of clarity. Strips of such 135 films may comprise up to six negatives. If the device is designed accordingly, the DX code can be read over the entire length of the strip. This is of special significance when individual DX codes are damaged or even no longer present, for example, due to tears, misstamping of the margin, etc. When, however, it is possible, as just explained, to read the DX code over the entire length, this information can be regained and the strip advanced for the correct treatment (elimination or preparing of prints).

Based on the following FIGS. (6 to 12), a more detailed exemplary embodiment of the inventive device will be explained, particularly the switch, which either does or does not divert the strip F into the turning channel, depending on whether or not the strip is to be turned (or removed).

Figure 6:
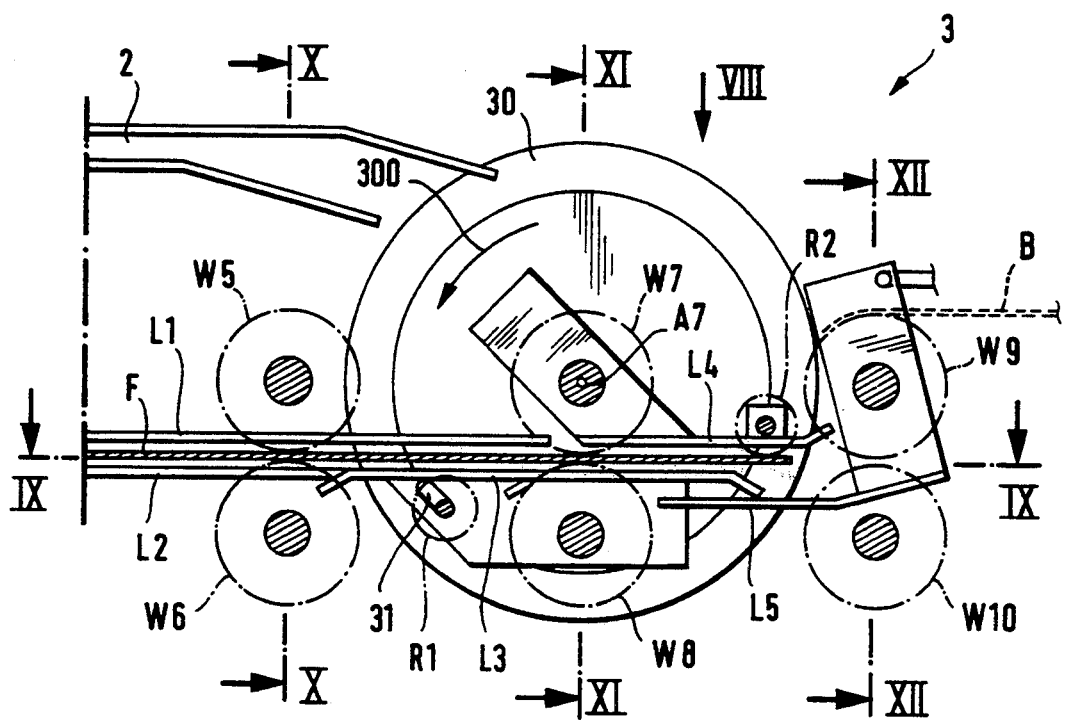
FIG. 6 shows an exemplary embodiment of the switch of the inventive device in a position in which the arriving strip is not diverted.

To this end FIG. 6 shows an embodiment of the switch. For reasons of symmetry only one half of the switch is shown in section. FIG. 6 shows the switch 3 in an initial terminal position, in which a strip F to be processed is not turned, but rather advanced without modification of further processing. This position shown in FIG. 6 is also the position in which the strip is held before the roller W8 and the guide plates L3 and L4 are rotated. It will be seen that the switch 3 comprises a disk 30, whose axis of rotation coincides with the axis of rotation A7 of the roller W7 and W8. The other roller W8 of this roller pair can rotate along with the guide plates L3 and L4 around this axis A7, since both the roller W8 and the guide plates L3 and L4 are secured to the disk 30. In addition, two cylinders R1 and R2 are provided to prevent the film strip F from buckling upward and jumping out of its path. The operation of the cylinders R1 and R2 will be described separately below.

Figure 7:
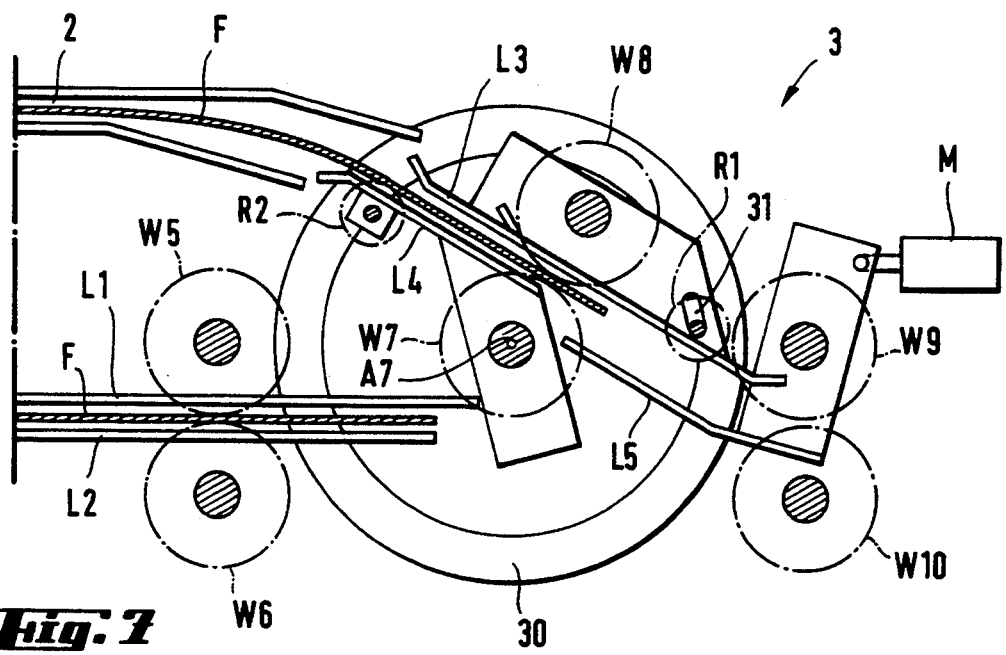
FIG. 7 shows the switch of FIG. 6 in a position in which the strip turned within the turning channel is conducted out of the turning channel.
Figure 8:
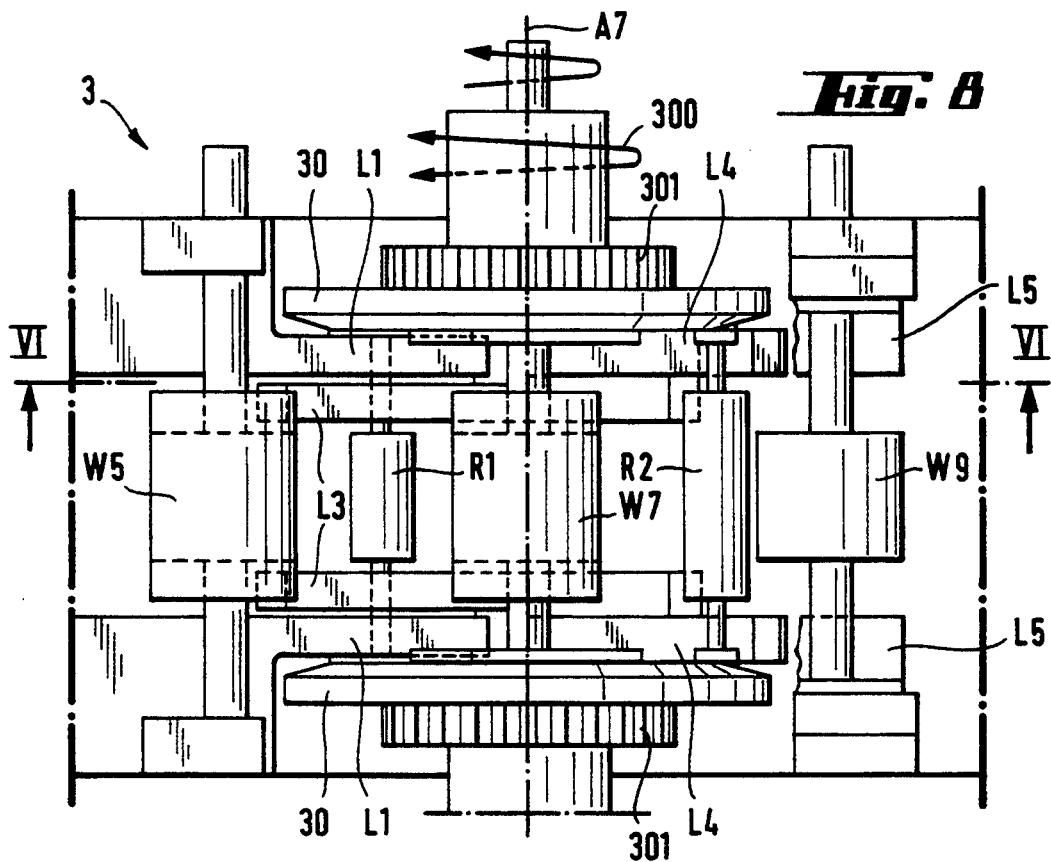
FIG. 8 shows view VIII of FIG. 6.
Figure 9:
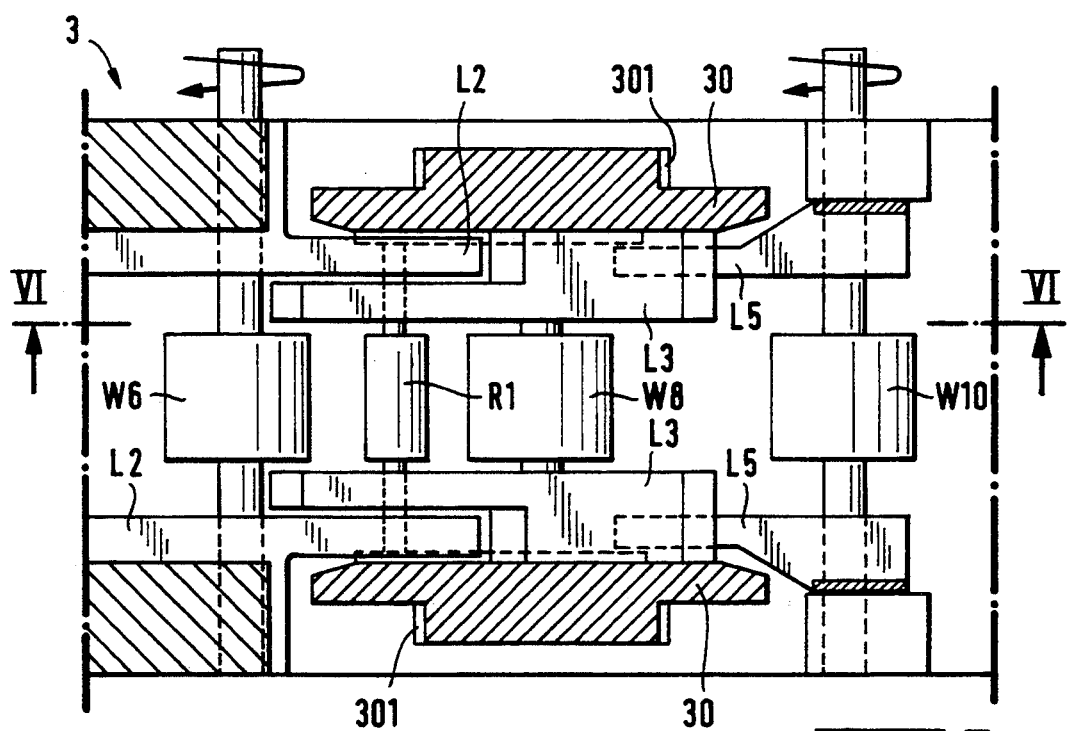
FIG. 9 shows view IX—IX of FIG. 6.

The design of switch 3 will be better understood from an examination of FIGS. 8 and 9, where FIG. 8 is a section according to arrow VIII of FIG. 6 (the "upper" half of the switch) and FIG. 9 is a section according to the line IX-IX of FIG. 6 (the "lower" half of the switch). These figures clearly show that for structural reasons, the transport rollers have a differing width, in order to permit the guide plates L3 and L4 to rotate, along with the disk 30, around axis A7 without these parts being impeded in the process by the roller W9 or the guide plate L5. This should become even more clear by a discussion of the mode of operation of switch 3 as based on FIG. 7.

If the strip F is to be turned, the strip first runs between the roller pair W7 and W8 (FIG. 6). As shown in FIG. 7, the disk 30 is then rotated counterclockwise around axis A7 into its second terminal position, in which the strip F is introduced into the turning channel 2, as already explained on the basis of FIGS. 3 and 4. Here the guide plate L5 is initially in resting position, as shown in FIG. 6.

When most of the strip F has entered the turning channel 2 (see FIG. 4), such that its end is located just in front of roller pair W7, WS, the guide plate L5 is moved by an electromagnet M into its second terminal position (FIG. 7), so that the strip F that has entered the turning channel 2 and has been turned can then be securely guided out of it and proceed between roller pair W9, W10. FIG. 7 shows the switch 3 in this second terminal position. The sensor S2 can determine whether the end of the strip F lies just in front of roller pair W7, W8, and thus whether the strip has been transported sufficiently close to the roller pair W7, W8 and whether the guide plate L5 can be swivelled into its second terminal position. When the back end of the strip F has passed the sensor S2, this sensor S2 produces a signal for the motor M2, which transports the strip over a predetermined path length and then stops. The electromagnet M which moves the guide plate L5 into its second terminal position can now be actuated.

To permit rotation of the guide plates L3, LA from the first terminal position of the switch 3 (FIG. 6) into the second terminal position (FIG. 7), together with the disk 30, these parts must be designed in such a way that they do not impede the disk during rotation. It is evident from FIG. 9 that the guide plates are designed so as to facilitate rotation of the disk 30 along with guide plates L3 and L4. Here the disk 30 is rotated in the direction of arrow 300 (FIG. 8). This turning motion can be executed by means of a gearwheel 301, which is connected to the disk 30, and by means of the servomotor MS. This may occur in such a way that, e.g., the servomotor MS is also disposed over a gearwheel which engages with gearwheel 301 and rotates it over a predetermined number of teeth.

Figure 10:
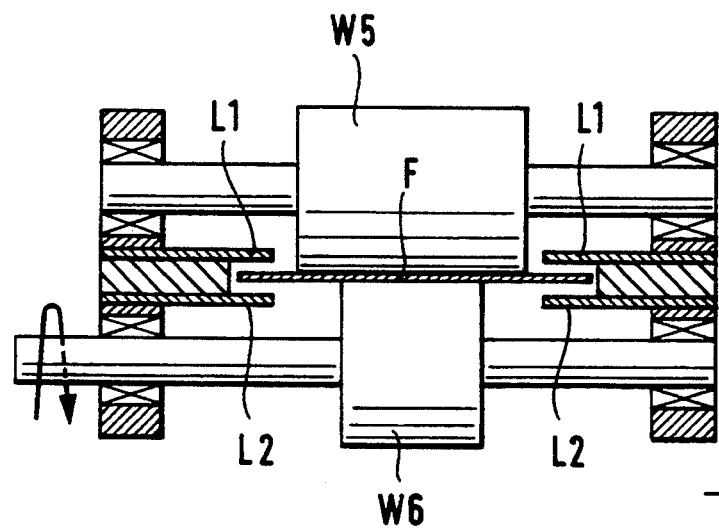
FIG. 10 shows section X—X of FIG. 6.
Figure 11:
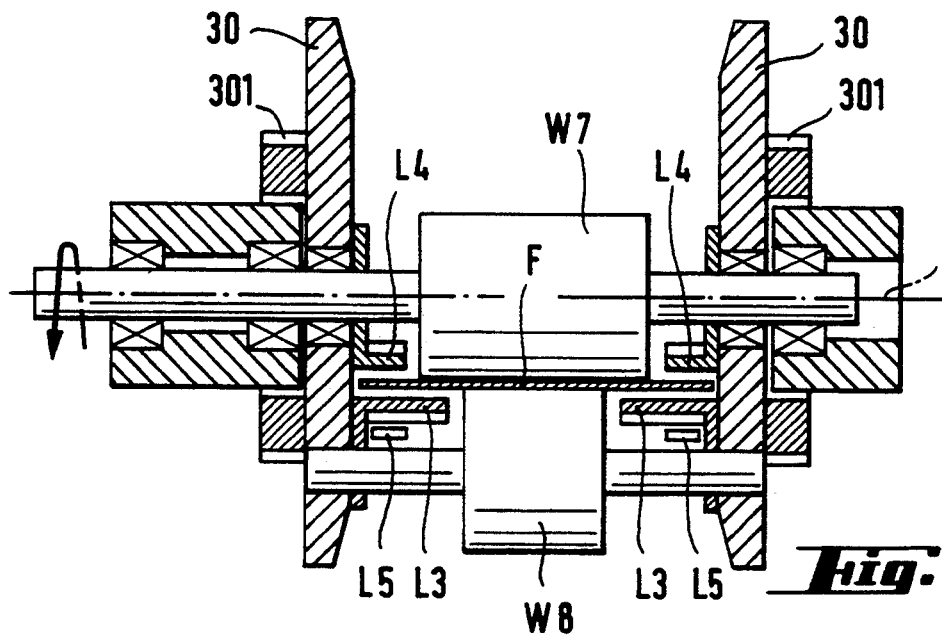
FIG. 11 shows section XI—XI of FIG. 6.
Figure 12:
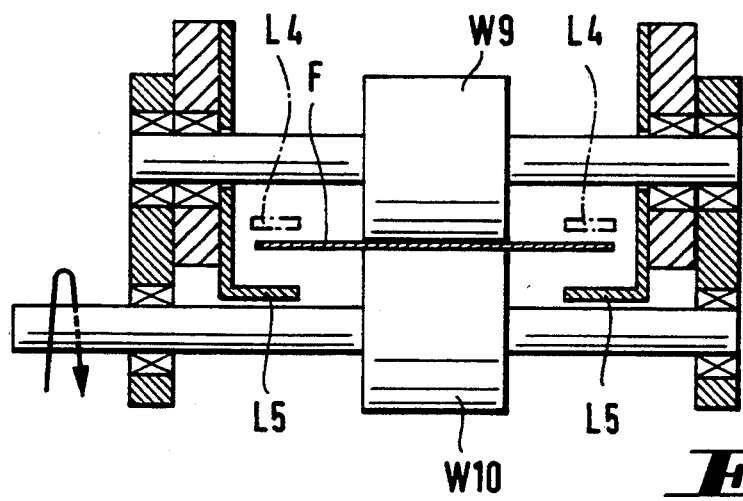
FIG. 12 shows section XII—XII of FIG. 6.

FIGS. 10, 11 and 12 show sections along lines X-X, XI-XI, and XII-XII. It is clear from these figures that the rollers of the individual roller pairs have differing widths, as determined by structural considerations. It is also clear that with roller pair W1, W2 (FIG. 1), roller pair W3, W4 (FIG. 1), roller pair W5, W6, and the other four roller pairs that are not shown between roller pair W3, W4, it is the lower roller that is driven. The rollers are driven synchronously. Driving the upper roller is equally possible. With roller pair W7 and W8, the upper roller W7 is driven so that when the strip F is diverted, the drive motor M2 does not have to be swiveling along with the roller W8. This can, however, be implemented if desired. The servomotor MS which moves the disk 30 from the first terminal position into the second terminal position operates directly on the disk 30, e.g., by means of a gearwheel, so that it does not have to be rotated. With roller pair W9, W10, the lower roller W10 is driven by the motor M3, though here a drive for the upper roller W9 is also possible.

At this point, discussion is directed to the two cylinders R1 and R2 (FIGS. 6 and 7) which prevent buckling of the strip F across the direction of transport. Cylinder R1 is positioned in an elongated hole 31 provided in the flange of guide plate L3, while cylinder R2 is immovably mounted. In the first position of disk 30, in which the strip F is not introduced into the turning channel 2, the cylinder R2 prevents buckling of the strip F in the upward direction (FIG. 6). The cylinder R1 plays no role when the disk 30 is in this position.

When the disk 30 is rotated into the position in which the strip is fed into the turning channel 2, however, cylinder R1 slides within the elongated hole to the lower end of said hole, with the result that it is the cylinder R1 that prevents upward buckling of the strip F in the given position of disk 30 and not the cylinder R2, as in the other disk position (FIG. 6). In the position of the disk 30 shown in FIG. 7, the cylinder R2 serves as a deflector for the transport of the strip F into and out of the turning channel 2.

When the strip F being processed leaves the switch 3, whether turned or not, further processing of the strip F then occurs. Since it is customary among today's devices to process tapes formed of many strips F, the individual strips F must be combined to form such a tape. A possibility for combining strips is shown in FIG. 6. There an adhesive strip B (broken line) is guided by the roller W9. This adhesive tape B extends over only a portion of the margin of film strip F. This adhesive tape B permits subsequent film strips F to be thus joined to form a long tape.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. A device for processing a strip of photographic tape material having a surface that is at least partially coated, said device comprising:

means for determining a position of a side of the strip having a coated surface;

a turning device having a turning channel which runs in a direction opposite to a direction of transport of the strip into which a strip to be turned is introduced with one end first and then conducted out of the turning channel with another end, opposite said first end, being guided out first for further processing; and a switch for advancing the strip for further processing without modification when, in a first case, the side of the strip with the coated surface is in a desired position, and for advancing the strip automatically into said turning device before said strip is further processed when, in a second case, the strip with the coated surface is not in the desired position said switch further comprising:

a first guide plate, a second guide plate, a first pair of transport rollers for transporting the Strip, and a disk secured to the first and second guide plates of the switch, said disk being coaxially positioned relative to an axis of rotation of a first transport roller of the first transport roller pair and being rotatable between two terminal positions around said axis of rotation, along with the first guide plate and along with a second transport roller of the first transport roller pair, such that in a first terminal position of the disk the first and second guide plates guide the strip unturned, and in a second terminal position the first and Second guide plates guide the strip into the turning channel.

2. A device according to claim 1, wherein a second transport roller pair and a third guide plate of the switch are positioned in succession, said third guide plate being rotatable coaxially, relative to an axis of rotation of a first transport roller of said second transport roller pair, between two terminal positions such that in a first terminal position said third guide plate advances the strip for further processing with the switch unturned, and in a second terminal position advances the strip for further processing from the turning channel.

3. A device according to claim 1, further comprising:
reading means located on a side of the transport path in a vicinity of a strip entrance, said reading means producing a turning signal based on a scanned bar code located on a margin of the strip and transmitting this signal to the switch and to drive motors and servomotors which transport the strip.

4. A device according to claim 3, wherein the reading means produce an elimination signal when it is not necessary to process a strip, and transmit the elimination signal to the switch and to the drive motors and servomotors for guiding the strip into the turning channel for removal.

5. Device according to claim 4, further comprising;
detection means positioned at the strip entrance for identifying the entering strip and for producing a drive signal for the drive motors of the transport rollers.

* * * * *